Aug. 8, 1933.    T. H. SYMINGTON    1,921,894
BOLSTER BEARING DEVICE
Original Filed March 22, 1927    3 Sheets-Sheet 1
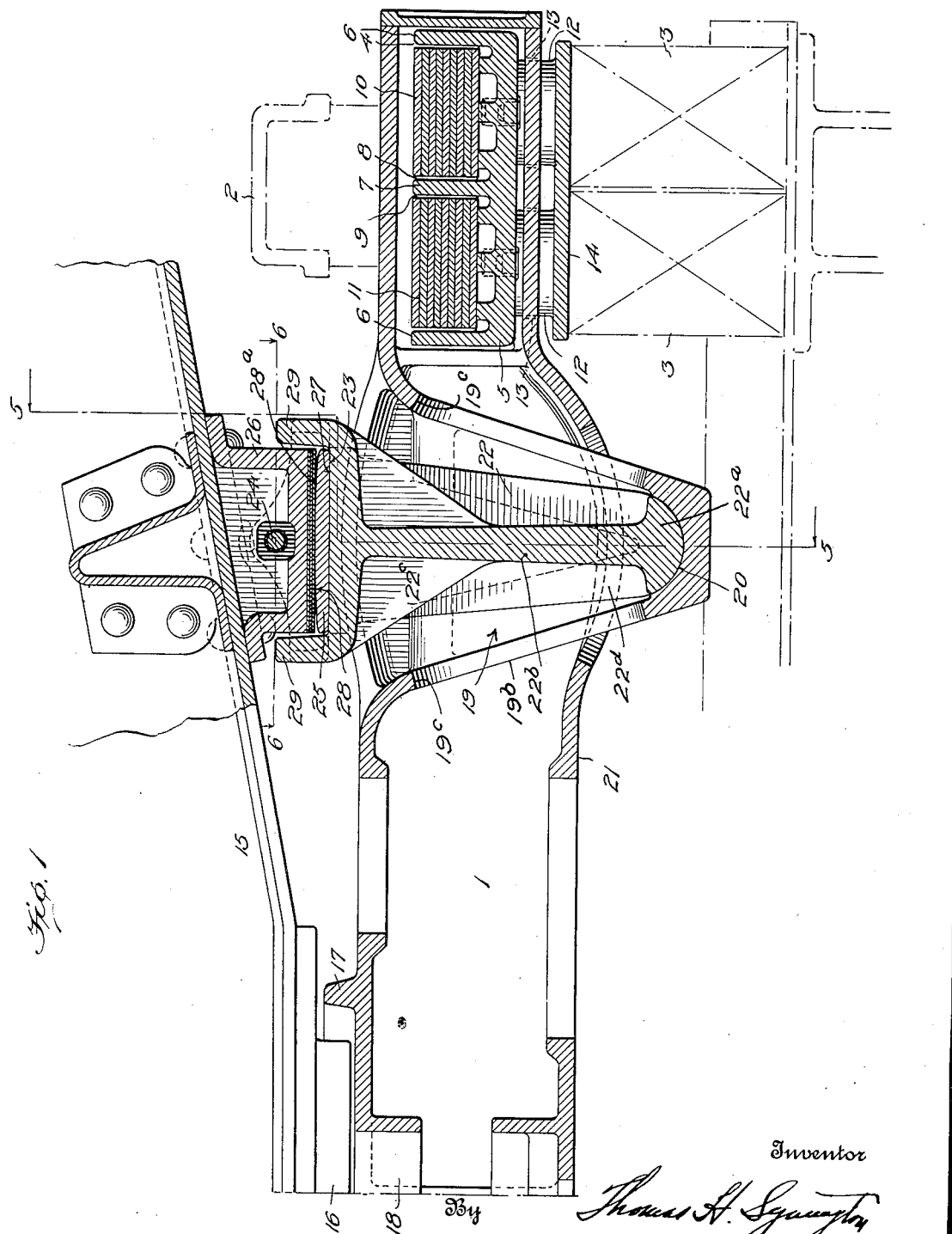

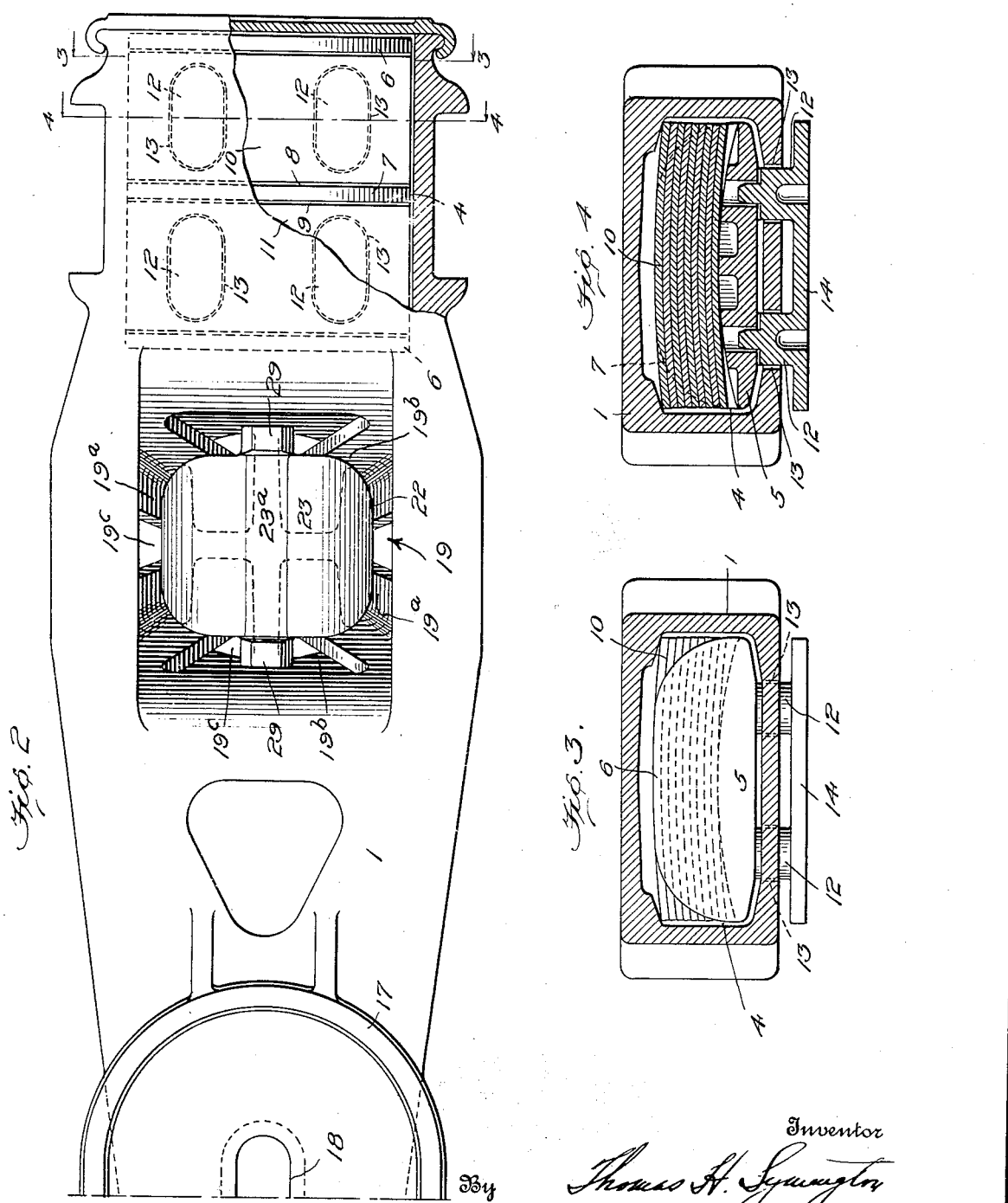

Aug. 8, 1933.  T. H. SYMINGTON  1,921,894
BOLSTER BEARING DEVICE
Original Filed March 22, 1927   3 Sheets-Sheet 3
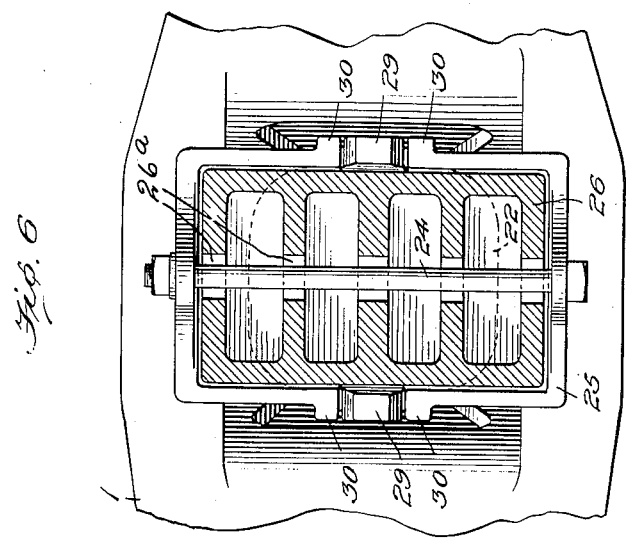
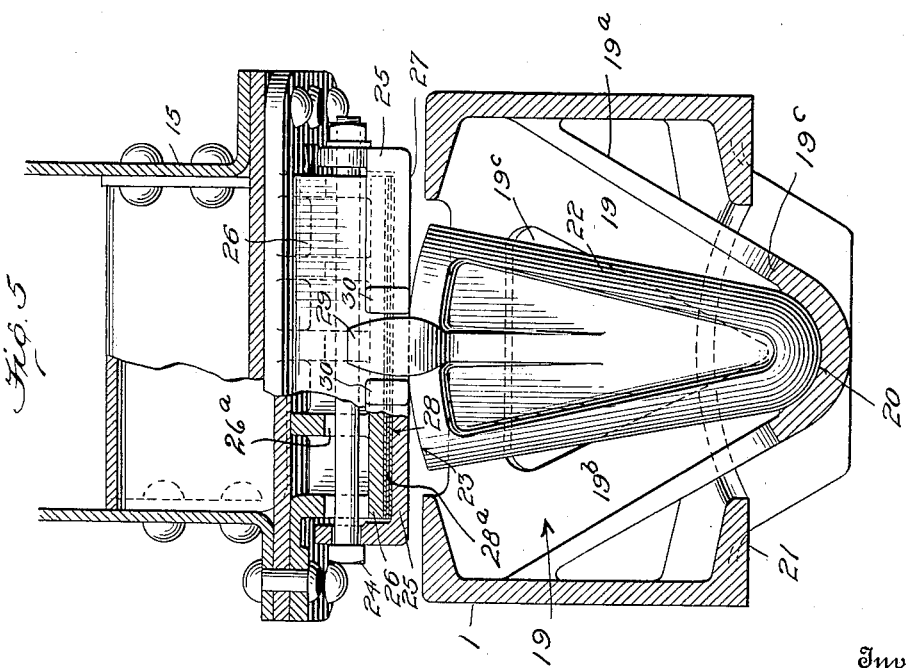

Patented Aug. 8, 1933

1,921,894

UNITED STATES PATENT OFFICE 1,921,894

BOLSTER BEARING DEVICE

Thomas H. Symington, Baltimore, Md., assignor to T. H. Symington & Son, Inc., of Baltimore, Md., a Corporation of Maryland Application March 22, 1927. Serial No. 177,285
Renewed February 12, 1931

31 Claims. (Cl. 308—224)

The invention relates to bolster and side bearing construction for railway car trucks.

The principal object of the invention, generally stated, is to provide a bolster and side bearing embodied therein, the entire structure being so arranged and combined as to permit not only the usual and necessary swivelling action of the body and truck bolsters with respect to each other but also relative longitudinal movement of the truck and body bolsters, this latter mentioned movement being known in the art as lateral motion in view of the fact that movement occurs laterally with respect to the side frames.

The object of the invention, more specifically stated, is to provide a railway car truck bolster equipped with side bearings in the nature of rockers which are capable of having what may be called a universal movement so as to permit swivelling movement of the bolsters as well as lateral motion, these rockers furthermore taking up any and all torsional strains which would otherwise occur.

An important object of the invention is to provide a bolster and side bearing structure of this character in which the combination is such that all forces applied will be at the longitudinal center line of the truck bolster so that torsional or eccentric forces in the bolster itself will be avoided.

Another object of the invention is to provide a bolster and side bearing structure in which the bearing points or areas for the lower ends of the side bearing rockers are preferably located at points considerably below the ends of the bolster and in fact in planes comparatively close to the bottom of the bolster supporting springs so as to attain the benefits of an underslung construction.

A further object of the invention is to provide a truck bolster and side bearing construction in which the entire load is preferably sustained upon the side bearings, strains and stresses upon the bolster being consequently distributed instead of being concentrated at the center as is the case in ordinary types of structure intended for the same general purpose.

A more specific object is to provide a truck bolster and side bearing rocker means mounted therein for cooperation with side bearing elements depending from the body bolster of a car, pockets being provided for the accommodation of the side bearing rockers, these pockets being so shaped and of such size with respect to the rockers as to permit the maximum necessary movement thereof but to prevent any overthrow in any direction, the pockets and rockers having, moreover, coacting portions or surfaces in the nature of ball and socket joints which will permit all necessary movements of the side bearing rockers in accordance with movements of the body bolster with respect to the truck bolster.

Another object of the invention is to provide a bolster and bearing construction of this character having means for normally centering the side bearing rockers with respect to the body bolster so that after any relative movement of the bolsters the parts will always return to normal or neutral position, slippage and consequent disarrangement of the parts or permanent changes in the relative positions thereof being entirely avoided.

A still more specific object of the invention is the provision of a truck bolster and side bearing structure embodying an intermediate element pivotally suspended beneath and cooperating with bearing elements depending from the body bolster, this intermediate element being capable of pivotal movement with respect to the body bolster when lateral motion occurs and having rolling contact with the side bearing rockers when relative swivelling movement of the bolsters occurs, the invention contemplating the interposition of a variable number of shims between this bearing element and the bearing member depending from the body bolster for the purpose of taking up wear and varying the clearance between the center bearing and center bearing plate.

Another object is the provision of a bolster structure embodying side bearing means of the character set forth and capable of being used as a replacement for a bolster of ordinary pattern without necessarily involving any changes in the construction of the side frames or other parts of the truck.

Yet another object is to provide a bolster and bearing structure of this character in which the bolster may further be equipped with auxiliary cushioning means located within its ends and acting in series with the truck springs for the purpose of breaking up synchronization and preventing development of car roll or side sway, the auxiliary cushioning means acting to increase the efficiency of the side bearing structure.

To the attainment of the foregoing and other objects and advantages, the invention preferably consists in the detailed structure and the arrangement and combination of parts to be hereinafter more fully described and claimed, and illustrated in the accompanying drawings in which:

Figure 1 is a vertical sectional view taken longitudinally through a truck bolster and body bolster showing the invention applied thereto, a side frame, the truck springs and a portion of the spring plank being shown diagrammatically by dot and dash lines, Figure 2 is a top plan view of the truck bolster with the side bearing rocker in place, Figure 3 is a vertical cross sectional view taken on the line 3—3 of Figure 2, Figure 4 is a similar view taken on the line 4—4 of Figure 2, Figure 5 is a vertical cross sectional view, with parts remaining in elevation, taken on the line 5—5 of Figure 1, and Figure 6 is a detail horizontal sectional view taken on the line 6—6 of Figure 1.

In the drawings it will be observed that only one end of the truck bolster and one end of the body bolster are disclosed for the reason that from the center outwardly both end portions are duplicates.

Referring more particularly to the drawings, the numeral 1 designates, generally, the truck bolster which may conform, in most respects, to the accepted standards insofar as size and mechanical construction are concerned, together with details as to internal reinforcement and the like. It is well known that a bolster of this type has each end portion adapted to be located within the window opening of a side frame 2 and that each end is supported upon truck springs 3. While details of the side frame, etc. have no bearing on the present case the somewhat diagrammatic illustration is given for the sake of clearness.

While it is not essential in the present instance, I prefer to provide the bolster with auxiliary spring or cushioning means indicated generally by the numeral 4, for the purpose of increasing the spring travel and capacity. This auxiliary structure may conveniently consist of a removable member 5 having end walls 6 and an intermediate or partition wall 7 forming compartments 8 and 9 within which are located banks or groups of leaf or plate springs 10 and 11, respectively, which have their ends bearing against the underside of the top wall of the bolster and which will be flexed to a greater or less extent depending upon load conditions. The underside of the member 5 is preferably recessed and engaging within such recesses are lugs or projections 12 extending through apertures 13 in the bottom wall of the bolster, these projections being carried by or formed upon a combined spring seat and follower 14 which rests upon the truck springs 3.

The body bolster may be of ordinary type and is indicated generally by the numeral 15. As the intention is to sustain the load on side bearings to be described, no load is permitted to come upon the center of the truck bolster, and for this reason the center plate 16 depending from the body bolster is simply coated by an elongated or substantially elliptical guide member which may be formed by providing an upstanding flange 17 on the top of the truck bolster, this structure being located in the same position as but replacing the usual center bearing. It will be noted that there is a slight clearness between the member 16 and the top of the truck bolster and that while the member 16 is restrained from movement transversely of the truck bolster it may move longitudinally thereof as the body bolster has lateral motion with respect to the side frames. The usual elongated apertures or slots 18 may be provided for receiving the king bolt or center pin (not shown) which merely functions, in the present instance, as means for limiting relative vertical movement of the bolsters so as to prevent them from becoming entirely disconnected.

In carrying out the essential part of the invention, the truck bolster 1 is formed inwardly of each end with a pocket 19 having its lower end provided with a socket having a spherical bearing surface 20. These pockets are of considerable length and project downwardly beyond the bottom wall 21 of the truck bolster so as to produce an underslung effect. It may of course be considered that the detailed construction which results in the formation of the pocket may be varied within considerable limits, but the pocket is preferably of an inverted frusto-pyramidal shape and defined by walls 19$^a$ and 19$^b$ arranged in upwardly converging relation and merging into the socket at the bottom of the pocket, these various walls being here represented as having openings 19$^c$ therein for the purpose of reducing the weight. This particular formation of the pocket may be considered as of advantage in that the frusto-pyramidal form will probably possess greater rigidity than any other shape. Furthermore the walls of the pockets may conceivably act as means to limit movement of the rockers, to be described, so that over throw thereof will be avoided.

Located within each pocket 19 is an elongated rocker member 22 which projects above the top surface of the truck bolster. While it is conceivable that this rocker member might vary in some particulars it is shown as having a spherical lower end 22$^a$ seating upon the spherical bearing surface 20 at the bottom of the pocket so as to be capable of rocking movement in any direction and also torsional movement with respect to the truck bolster, all in accordance with movements of the body bolster with respect to the truck bolster during car travel. The upper end of the rocker is enlarged and is formed with a surface of revolution 23, preferably partially cylindrical, and the rocker is so positioned that the generatrix of the cylindrical surface of revolution extends in a direction parallel with the longitudinal axis of the body bolster. Mechanically, the intermediate portion 22$^b$ of the rocker may be relatively small or thin whereas the upper end is extended laterally beyond the same to a considerable extent, there being a plurality of webs 22$^c$ and 22$^d$ provided for reinforcing purposes. Obviously, the rocker might be of solid construction if preferred but for the sake of lightness the details above pointed out may be resorted to.

Pivotally connected to the body bolster as by means of a pivot pin 24 and fashioned with two bearing faces, one at its top and one at its bottom, is a shoe member 25 interposed between the rocker member 22 and between a bearing element 26 rigidly secured to and depending from each end portion of the body bolster. The lower bearing face 27 of the shoe is flat while the upper surface 28 is formed as a surface of revolution, preferably a portion of a cylinder in shape. The pivot bolt 24 above referred to which holds the shoe in place passes through the depending bearing element 26 which is formed with enlarged openings 26ª so that the shoe member may be moved or adjusted with respect to the rocker 22 and bearing element 26 by means to be described. It is contemplated that shims 28ª may be interposed between the cylindrical bearing surface 28 of the shoe member and the correspondingly flat undersurface of the bearing element 26 for adjusting the position of the body bolster with respect to the truck bolster and for taking up any wear which may occur as the result of prolonged use.

The curvature of the outer ends of the curved surface of the shoe is greater than the curvature thereof at points intermediate the ends so that when lateral motion of the body bolster occurs a bearing area of substantial size is provided between the bearing member and shoe rather than a point contact as would be the case when the limit of lateral shifting is reached if the directrix of the cylindrical surface were truly circular. By making the face 27 of the shoe flat an equal distribution of the load imposed on each of the rockers is assured.

The pivotal axis and the generatrix of the upper cylindrical surface of the shoe extend at right angles or are normal to the longitudinal axis of the bolsters. It is apparent that when the parts of the side bearing structure are assembled in this manner, upon swivelling movement of the bolsters relatively to each other the cylindrical surface 23 of the rocker will roll along the flat surface 27 of the shoe 25. It is also clear that the cylindrical surface 28 of the shoe will roll with respect to the undersurface of the bearing element 26 or with respect to any shims which may be interposed, this action occurring upon lateral movement of the body bolster with respect to the truck.

Inasmuch as the radius of the cylindrical surface 28 of the shoe is greater than the distance from the lower end of the rocker member to the upper end thereof and from the lower end thereof to the surface 28 of the shoe, the car body will be elevated when lateral motion occurs. As the result of this, gravity will act to restore the parts to normal or neutral position upon the completion of any lateral motion having an elevating effect.

In order to maintain the bearing devices normally in upright position and hence the bolsters in central position such as should be assumed by them when the car is travelling on straight even track, it may be advisable to provide the cylindrical surface of the rocker with a flat portion 23ª of comparatively slight extent arranged parallel with the generatrix of said curved surface and, preferably, entirely across the same.

Since the body bolster is mounted for swivelling movement with respect to the truck bolster and as the shoe member is connected to the body bolster and the rocker member primarily carried by the truck bolster, it is advisable, if not essential, that the same operative relationship be maintained between the shoe and rocker at all times. The means for accomplishing this desirable end may advantageously consist of teeth 29 formed on the rocker and cooperating with teeth, lugs or projections 30 on the shoe. By this arrangement the operative relation of the parts remains unchanged at all positions which they may assume in service and the generatrix of the cylindrical surface of the rocker is maintained in the same plane with and substantially parallel to the longitudinal axis of the body bolster. In view of the fact that the shoe member fits within the upper end of the rocker it is clear that upon relative swivelling movement of the truck and the body bolsters there will be a torsional effect on the rocker resulting in rotation thereof about its vertical axis and upon the spherical bearing surface 20.

In the operation it will of course be apparent that the usual and necessary relative swivelling movement of the truck and body bolsters may occur while at the same time lateral motion is provided for. The lifting feature is of considerable advantage inasmuch as this combined with the provision of a four point support for the car body will avoid derailment on normal track by the unloading of the car wheels at one corner as is the case with cars having only the usual two point supporting means. Ample provision has been made whereby the height of the body bolster with respect to the truck bolster may be varied so as to insure proper clearance between the elements which correspond with the usual center plate. The employment of shims between the pivoted shoe and the depending bearing element carried by the body bolster provides a very ready means not only of effecting such adjustment but for taking up wear which would probably result in lowering of the body bolster with respect to the truck bolster. Such shims are easily replaceable and as the wear is thus taken up all of the parts will have a much greater length of life than would otherwise be the case. In fact every contingency has been contemplated and provided for so that the entire structure should operate with the maximum efficiency. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus decsribed the invention, I claim:

1. In a railway car, the combination of a truck bolster, a body bolster mounted for swivelling movement and lateral motion, and side bearing means carried by the truck bolster for supporting the body bolster, the side bearing means including rockers mounted for universal movement within the truck bolster, and movably mounted shoe members carried by the body bolster and coacting with the rockers.

2. In a railway car, the combination of a truck bolster, a body bolster mounted for swivelling movement and lateral motion, and side bearing means carried by the truck bolster for supporting the body bolster, the side bearing means including rockers mounted for universal movement within the truck bolster, and shoe members carried by the body bolster and coacting with the rockers, the shoe members being rockable with respect to the body bolster and the rocker members having rolling contact with the shoe members.

3. In combination, a truck bolster, a body bolster mounted for swivelling movement and lateral motion with respect thereto, bearing means within the truck bolster, rockers seated upon said bearing means, bearing elements depending from the body bolster, and shoe members pivotally mounted upon said bearing elements and interposed between the side bearing elements and the rocker members.

4. In combination, a truck bolster, a body bolster mounted for swivelling movement and lateral motion with respect thereto, bearing means within the truck bolster, rockers seated upon said bearing means, bearing elements depending from the body bolster, shoe members pivotally mounted upon said bearing elements and interposed between the side bearing elements and the rocker members, the shoe members having curved upper surfaces rockably engaging said depending bearing elements and having flat undersurfaces, and said rocker members having cylindrical upper surfaces coacting with said flat surfaces during relative swivelling movement of the bolsters.

5. In combination, a truck bolster, a body bolster mounted for swivelling movement and lateral motion with respect thereto, bearing means within the truck bolster, rockers seated upon said bearing means, bearing elements depending from the body bolster, shoe members pivotally mounted upon said bearing elements and interposed between the side bearing elements and the rocker members, the shoe members having curved upper surfaces rockably engaging said depending bearing elements and having flat undersurfaces, and said rocker members having cylindrical upper surfaces coacting with said flat surfaces during relative swivelling movement of the bolsters, means confining the rocker members to the shoe members and depending bearing elements, the contacting portions of the rocker members and the bearing means therefor being spherical.

6. In combination, a truck bolster formed with pockets, a body bolster having depending bearing elements located above the pockets, shoe members pivotally mounted on said bearing elements and suspended therebelow, said shoe members having transversely curved upper surfaces coacting with the undersurfaces of said bearing elements and having flat undersurfaces, rockers mounted within said pockets and having curved upper surfaces coacting with the flat undersurfaces of the shoe members, the rocker members having spherical lower ends and the pockets having spherical sockets receiving said spherical ends of the rockers.

7. In combination, a truck bolster formed with pockets, a body bolster having depending bearing elements located above the pockets, shoe members pivotally mounted on said bearing elements and suspended therebelow, said shoe members having transversely curved upper surfaces coacting with the undersurfaces of said bearing elements and having flat undersurfaces, rockers mounted within said pockets and having curved upper surfaces coacting with the flat undersurfaces of the shoe members, the rocker members having spherical lower ends and the pockets having spherical sockets receiving said spherical ends of the rockers, the curved surfaces of said rocker members having flat central portions of relatively small area.

8. In combination, a truck bolster formed with pockets, a body bolster having depending bearing elements located above the pockets, shoe members pivotally mounted on said bearing elements and suspended therebelow, said shoe members having transversely curved upper surfaces coacting with the undersurfaces of said bearing elements and having flat undersurfaces, rockers mounted within said pockets and having curved upper surfaces coacting with the flat undersurfaces of the shoe members, the rocker members having spherical lower ends and the pockets having spherical sockets receiving said spherical ends of the rockers, and coacting means on the shoe members and rocker members for normally holding the parts centered and returning them to central position subsequent to relative swivelling movement of the bolsters.

9. In combination, a truck bolster formed with pockets, a body bolster having depending bearing elements located above the pockets, shoe members pivotally mounted on said bearing elements and suspended therebelow, said shoe members having transversely curved upper surfaces coacting with the undersurfaces of said bearing elements and having flat undersurfaces, rockers mounted within said pockets and having curved upper surfaces coacting with the flat undersurfaces of the shoe members, the rocker members having spherical lower ends and the pockets having spherical sockets receiving said spherical ends of the rockers, the shoe members being mounted for movement toward or from said bearing elements, and a variable number of removable shims interposed between the shoe members and said bearing elements.

10. In combination, a truck bolster formed with pockets, a body bolster having depending bearing elements located above the pockets, shoe members pivotally mounted on said bearing elements and suspended therebelow, said shoe members having transversely curved upper surfaces coacting with the undersurfaces of said bearing elements and having flat undersurfaces, rockers mounted within said pockets and having curved upper surfaces coacting with the flat undersurfaces of the shoe members, the rocker members having spherical lower ends and the pockets having spherical sockets receiving said spherical ends of the rockers, said rockers and pockets extending to a plane considerably below the bottom wall of the truck bolster.

11. In combination, a truck bolster formed with pockets, a body bolster having depending bearing elements located above the pockets, shoe members pivotally mounted on said bearing elements and suspended therebelow, said shoe members having transversely curved upper surfaces coacting with the undersurfaces of said bearing elements and having flat undersurfaces, rockers mounted within said pockets and having curved upper surfaces coacting with the flat undersurfaces of the shoe members, the rocker members having spherical lower ends and the pockets having spherical sockets receiving said spherical ends of the rockers, each rocker being of elongated form with a relatively constricted central portion having a plurality of longitudinally extending reinforcing webs thereon.

12. In combination, a truck bolster formed with pockets, a body bolster having depending bearing elements located above the pockets, shoe members pivotally mounted on said bearing elements and suspended therebelow, said shoe members having transversely curved upper surfaces coacting with the undersurfaces of said bearing elements and having flat undersurfaces, rockers mounted within said pockets and having curved upper surfaces coacting with the flat undersurfaces of the shoe members, the rocker members having spherical lower ends and the pockets having spherical sockets receiving said spherical ends of the rockers, the rocker having upwardly projecting teeth located at opposite sides of the shoe member and side bearing element, and the side bearing elements having spaced lugs thereon located at opposite sides of and engaging said teeth to act as centering means for maintaining the relative positions of the parts under all conditions.

13. In combination, a truck bolster, a body bolster adapted to have swivelling movement and lateral motion, the truck bolster having pockets near its ends, rockers mounted within said pockets, the lower ends of the rockers and the contacting portions of the pockets having spherical bearing areas, the upper ends of the rockers having partially cylindrical surfaces, with the axis of curvature extending longitudinally of the truck bolster, bearing elements depending from the body bolster, and shoe members pivotally mounted upon said bearing elements and having flat lower surfaces coacting with the cylindrical upper surfaces of the rockers, the shoe members further having partially cylindrical upper surfaces with the axis of curvature extending transversely of the body bolster, the upper surfaces of the shoe members coacting with the flat undersurfaces of said bearing elements.

14. In combination, a truck bolster, a body bolster adapted to have swivelling movement and lateral motion, the truck bolster having pockets near its ends, rockers mounted within said pockets, the lower ends of the rockers and the contacting portions of the pockets having spherical bearing areas, the upper ends of the rockers having partially cylindrical surfaces, with the axis of curvature extending longitudinally of the truck bolster, bearing elements depending from the body bolster, shoe members pivotally mounted upon said bearing elements and having flat lower surfaces coacting with the cylindrical upper surfaces of the rockers, the shoe members further having partially cylindrical upper surfaces with the axis of curvature extending transversely of the body bolster, the upper surfaces of the shoe members coacting with the flat undersurfaces of said bearing elements, and means on the rocker members disposed at the sides of said bearing elements preventing relative torsional movement of the depending bearing elements and the rocker members whereby torsional strain applied to the rocker members upon relative swivelling movement of the truck and body bolsters will cause rotation of the rocker members about their vertical axes.

15. In a railway car, a body bolster, a truck bolster, and means interposed therebetween for supporting the former upon the latter, said means involving a rocker member mounted for universal movement in the truck bolster, and a bearing shoe, said bearing shoe being pivotally attached to the body bolster and affording a bearing surface for the upper end of the rocker member, the pivotal axis of the bearing shoe extending transversely of the body bolster.

16. In combination, a body bolster, a truck bolster, and a plurality of means interposed between the bolsters supporting the body bolster during swivelling movement and lateral motion thereof, each of said means involving a rocker member and a bearing shoe, said shoe being pivotally attached to the body bolster and having an upper bearing surface engageable with the body bolster and a lower bearing surface engageable with the rocker member, said upper bearing surface being curved longitudinally of the bolster and bearing against a flat surface on the body bolster so as to be capable of rocking movement.

17. In combination, a body bolster, a truck bolster, and means interposed between the bolsters supporting the former upon the latter during lateral motion of the body bolster with respect to the truck and relative swivelling movement of the bolsters, said means involving a rocker member carried by the truck bolster and a bearing member carried by the body bolster, each of said members being formed with surfaces of revolution and associated in a manner such that their axes of revolution are substantially normal one to the other.

18. A railway car having a body bolster and a truck bolster and means supporting the former upon the latter during relative swivelling movement of the bolsters involving a shoe pivotally secured to the body bolster and a rocker member carried by the truck bolster, said shoe being provided with a curved bearing surface and a flat bearing surface, one of said surfaces being engageable with the body bolster and the other with the rocker member, the curvature of said curved surface being greatest at points remote from the pivotal axis of the shoe.

19. In a railway car, a body bolster, a truck bolster, and bearing means interposed between said bolsters involving an elongated rocker member mounted for universal movement in the truck bolster and having a cylindrically curved surface, and means associated with the rocker for maintaining the generatrix of said cylindrically curved surface in a plane substantially parallel with the plane of the longitudinal axis of the body bolster.

20. A railway car having a body bolster and a truck bolster, and means interposed between the bolsters for supporting the former upon the latter during relative movements thereof, said means involving a plurality of elongated rocker members, each of said members being provided with a cylindrically curved surface, and interfitting means on the body bolster and each of said rockers for maintaining the generatrix of their respective cylindrical surfaces in planes substantially parallel with the longitudinal axis of the body bolster.

21. In a railway car, a body bolster and a truck bolster, and means supporting the former upon the latter during swivelling movements of the bolsters and lateral motion, said means involving a shoe pivotally mounted on the body bolster and a rocker member carried by the truck bolster, the rocker member having a surface of revolution engageable with the shoe and means associated with the rocker for maintaining the pivotal axis of the shoe and the axis of the said surface of revolution substantially normal one to the other.

22. In a railway car, a body bolster and a truck bolster, a shoe pivotally mounted on the body bolster, and a rocker carried by the body bolster and provided with a surface of revolution engageable with the shoe, said rocker having teeth cooperable with lugs on the shoe for maintaining the axis of the said surface of revolution of the rocker normal to the pivotal axis of the shoe.

23. In a railway car, a body bolster and truck bolster and connecting means therefor whereby relative movements of the bolsters in a plurality of directions may occur, said means involving a shoe carried by the body bolster and a rocker carried by the truck bolster, said rocker having a surface of revolution for rolling engagement with the shoe, and lugs on the shoe cooperable with teeth on the rocker for maintaining the axis of the said surface of revolution of the rocker in a vertical plane substantially parallel with the longitudinal axis of the body bolster.

24. A railway car having a body bolster and a truck bolster and means interposed between said bolsters for supporting one of the bolsters with respect to the other, said means involving a rocker member having its upper end formed with a cylindrically curved surface and its lower end formed with a spherically curved surface, and a bearing element rockably suspended from the body bolster and having interfitting engagement with the rocker.

25. In a bearing device for railway cars, the combination of an upper bearing member, and a shoe pivotally secured thereto, said shoe having upper and lower bearing faces, the upper face being curved and adapted to have rolling engagement with the said bearing member, and shims interposed between the upper bearing member and the shoe.

26. A rocker member for a railway bearing device having upper and lower bearing faces, one of said faces being spherically curved, and the other of said faces being cylindrically curved and having adjacent its central portion a flat portion, said flat portion extending in a direction parallel to the generatrix of the cylindrically curved face.

27. In a bearing device for railway cars, the combination of an upper bearing member, a rocker, and a shoe pivotally secured to the bearing member and adapted to be interposed between the said member and rocker, the rocker and shoe each having a curved bearing surface, the curved bearing surface of the rocker being engageable with the shoe and that of the shoe being engageable with the member, and means for varying the distance between the lower face of the upper bearing member and the rocker engaging face of the shoe.

28. In combination, a body bolster, an element depending therefrom, a bearing member pivoted on said element and having a cylindrical surface coacting therewith, said cylindrical surface having its directrix and generatrix extending transversely of the bolster, a truck bolster having a pocket therein with a spherical bearing surface, and a rocker located within the pocket and having a spherical lower end conformingly engaging said spherical surface and having a cylindrical upper surface engaging the flat lower surface of said bearing member carried by the body bolster, the directrix and generatrix of said second named cylindrical surface extending longitudinally of the truck bolster, the radius of the first named curved surface being greater than the distance between said coacting spherical surfaces and the second named cylindrical surface whereby to effect elevation of one end of the body bolster when lateral motion occurs.

29. In combination, a body bolster, an element depending therefrom, a bearing member pivoted on said element and having a cylindrical surface coacting therewith, said cylindrical surface having its directrix and generatrix extending transversely of the bolster, a truck bolster having a pocket therein with a spherical bearing surface, and a rocker located within the pocket and having a spherical lower end conformingly engaging said spherical surface and having a cylindrical upper surface engaging the flat lower surface of said bearing member carried by the body bolster, the directrix and generatrix of said second named cylindrical surface extending longitudinally of the truck bolster, the relation of the curved surfaces being such as to cause elevation of the body bolster with respect to the truck bolster when lateral motion occurs.

30. In a railway car truck, the combination of a truck bolster formed with a pocket, a body bolster mounted for swivelling and lateral motion with respect to the truck bolster, rocker means mounted within the pocket for universal swivelling movement, and bearing means depending from the body bolster for cooperation with the rocker means, said bearing means being movable with respect to the body bolster.

31. In a railway car truck, the combination of a truck bolster, side bearing rocker means mounted therein for universal movement, a body bolster mounted for swivelling movement and lateral motion with respect to the truck bolster, and freely movable means carried by the body bolster for cooperation with said rocker means.

THOMAS H. SYMINGTON.